July 16, 1940.　　　G. W. HEISE ET AL　　　2,207,734
ELECTRIC CELL
Filed June 19, 1937　　　3 Sheets-Sheet 1

INVENTORS
ERWIN A. SCHUMACHER
GEORGE W. HEISE
BY
ATTORNEY

July 16, 1940.    G. W. HEISE ET AL    2,207,734
ELECTRIC CELL
Filed June 19, 1937    3 Sheets-Sheet 2

INVENTORS
ERWIN A. SCHUMACHER
GEORGE W. HEISE
BY *E. L. Greenewald*
ATTORNEY

July 16, 1940.  G. W. HEISE ET AL  2,207,734
ELECTRIC CELL
Filed June 19, 1937  3 Sheets-Sheet 3

INVENTORS
ERWIN A. SCHUMACHER
GEORGE W. HEISE
BY *Greenewald*
ATTORNEY

Patented July 16, 1940

2,207,734

UNITED STATES PATENT OFFICE 2,207,734

ELECTRIC CELL

George W. Heise, Rocky River, and Erwin A. Schumacher, Lakewood, Ohio, assignors to National Carbon Company, Inc., a corporation of New York Application June 19, 1937, Serial No. 149,076

5 Claims. (Cl. 136—136)

This invention relates to electric cells and especially to cells having improved electrodes therein. In the following specification, emphasis will be placed on specific applications of the invention to improvements in electric cells of the type provided with at least one gas permeable carbon electrode having a portion of its surface in contact with electrolyte and another portion of its surface in contact with a gas, and more particularly to improvements in an air depolarized primary galvanic cell having zinc and carbon electrodes immersed in a caustic alkali electrolyte; but that the invention is capable of many other embodiments will become apparent as the following description proceeds.

Porous carbon electrodes have been used in air depolarized primary electric cells and are described, for instance, in Patent 2,010,608 issued to us and Victor C. Hamister jointly, and Patent 2,017,280 issued to us jointly. Electrodes of this type serve to conduct oxygen from the atmosphere to a depolarizing region within the cell, and ordinarily consist of a baked block of carbon and binder adapted to be partially immersed in the electrolyte.

One of the important factors limiting the effectiveness of depolarization, the practical rate of discharge in service, and the useful life of an air depolarized cell is the rate at which oxygen is supplied to the depolarizing region. We have observed that any condition which tends to hinder, block or prevent the desired transfer of oxygen by lengthening, restricting, or blocking the path of the oxygen decreases the usefulness of the cell. An analogous effect has been observed in other types of cells which utilize a flow of fluid through an electrode to or from a depolarizing region.

An object of this invention is to shorten, and to free from obstacles, the path of fluid to or from a depolarizing region of the cell, and especially the path of oxygen from the air to the cathodic depolarizing region of an air depolarized galvanic cell.

Another object is to provide an electric cell employing an improved porous carbon electrode having one or more internal cavities serving to assist in passing fluid through the electrode; and a further object, particularly important in primary battery applications, is to improve the resistance of such an electrode to penetration by electrolyte.

Another object of the invention is to provide a light, mechanically strong, compact, and inexpensive assembly comprising one or more porous carbon electrodes and an electrolyte-proof supporting member arranged to provide a ventilating well or cavity adjacent to a portion of the electrode. A further object is to provide an electrode supporting member adapted to hold a plurality of panels of porous carbon.

These and other objects of the invention are attained by the methods and means described below.

Representative embodiments of the invention in various types of air depolarized galvanic cells are illustrated in the attached drawings, in which.

Figure 1:
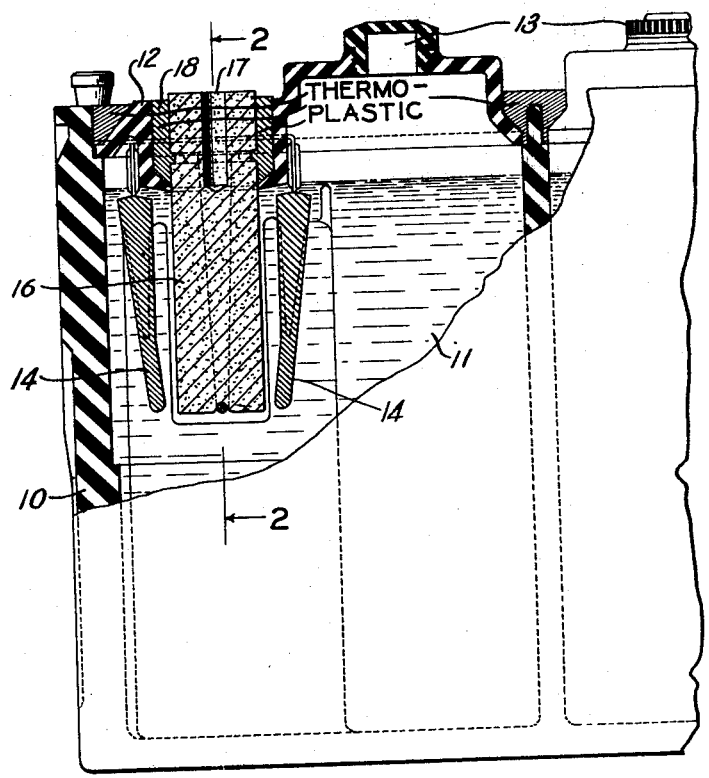
Figure 1 is a partial vertical section of a battery cell embodying the invention.

In the embodiment shown in Figure 1 there is an outer casing 10 containing an electrolyte 11 or electrolyte-forming material. The casing may be made of any of the usual battery case materials, such as metal, glass, wood, rubber, resin, or wax. The casing is provided with a cover 12 having a closable aperture or filler hole 13. Within the casing 10 are a soluble electrode metal 14 and an electrolyte-repellent porous carbon electrode 16, the latter being provided with one or more ventilating holes 17 open to the air at one end, closed to electrolyte, and extending approximately to the electrolyte level. The electrodes 14 and 16 may be supported by the casing in any well known manner such as by ears on the electrodes 14 which fit into corresponding recesses on the sides of the casing. These ears are shown in dotted lines on Figure 1 of the drawings. The electrode 16 is supported by a support wire under the electrode as is also shown in Figure 1. The particular manner of supporting the electrodes forms no part of the present invention and is disclosed in U. S. Patent 2,051,987 to Domizi, dated August 25, 1936. The carbon electrode 16 is secured to the cover 12 by thermoplastic sealing material 18.

Figure 3:
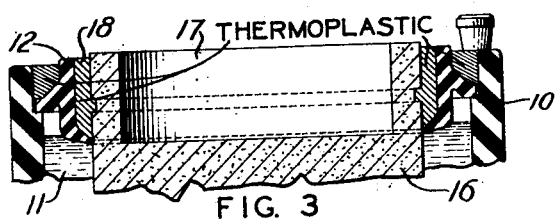
Figure 3 is a view similar to Figure 2, showing another embodiment in which a single large hole or well is formed in the carbon electrode.

In the embodiment shown in Figure 3 a single large hole or well 17 is employed instead of the plurality of ventilating holes. In the embodiment shown in Figure 4, the ventilating holes 17 extend nearly to the full depth of the electrode.

Figure 5:
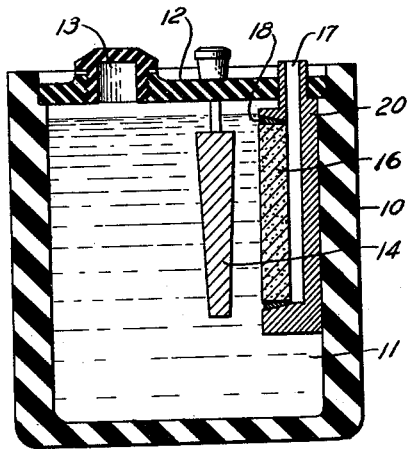
Figure 5 is a vertical section of a cell wherein full ventilation of the porous carbon electrode is obtained by the use of a hollow frame located at the end of the casing.

In the embodiment shown in Figure 5 a hollow frame 20 is located at the end of the casing 10 to secure full ventilation of the porous carbon electrode 16.

Figure 6:
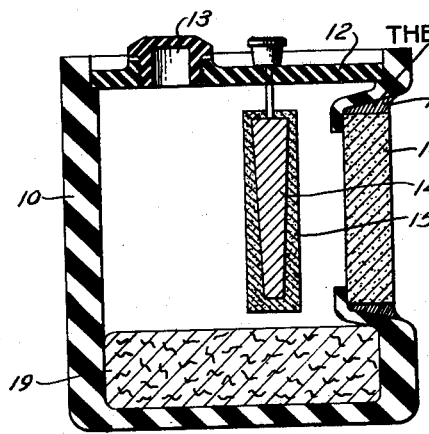
Figure 6 is a vertical cross section of another type of primary galvanic cell wherein one face of the porous carbon electrode is permitted to protrude through the casing and is therefore fully ventilated.
Figure 8:
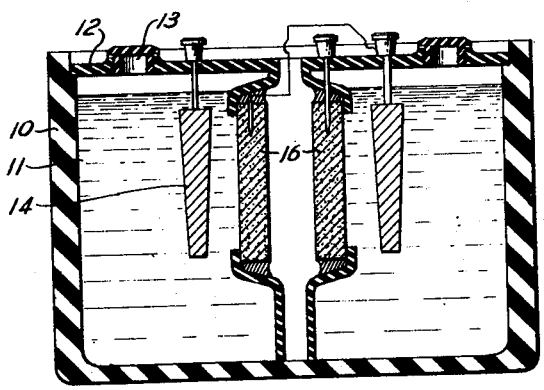
Figure 8 is a vertical section of a battery comprising two cells of the type shown in Figure 6, activated and ready for use.

In the modification shown in Figure 6, the zinc electrode 14 is surrounded by casting of electrolyte-forming material 15 producing a cell of the deferred action type which is activated for use by adding water through the filler hole 13. A body 19 of electrolyte regenerating material, for example a mixture of lime or Bentonite with cellulose pulp, is located at the bottom of the casing 10. In Figure 8 two of the cells of the type shown in Figure 6 are combined to form a battery, the cells being shown as activated and ready for use.

Figure 7:
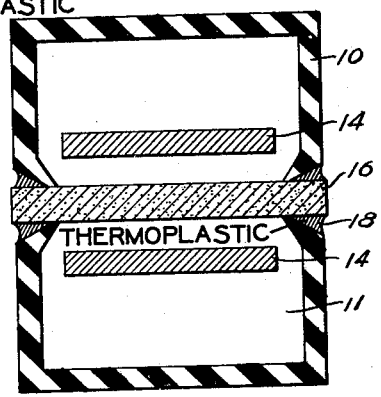
Figure 7 is a horizontal section of a cell wherein ventilation of the porous carbon electrode is obtained by permitting the sides thereof to protrude through the casing.

In Figure 7 ventilation of the porous carbon electrode 16 is obtained by permitting at least one of the sides of the electrode to protrude through the casing 10. Although both sides are shown as protruding in the figure it is obvious that one side only may be permitted to protrude.

Figure 9:
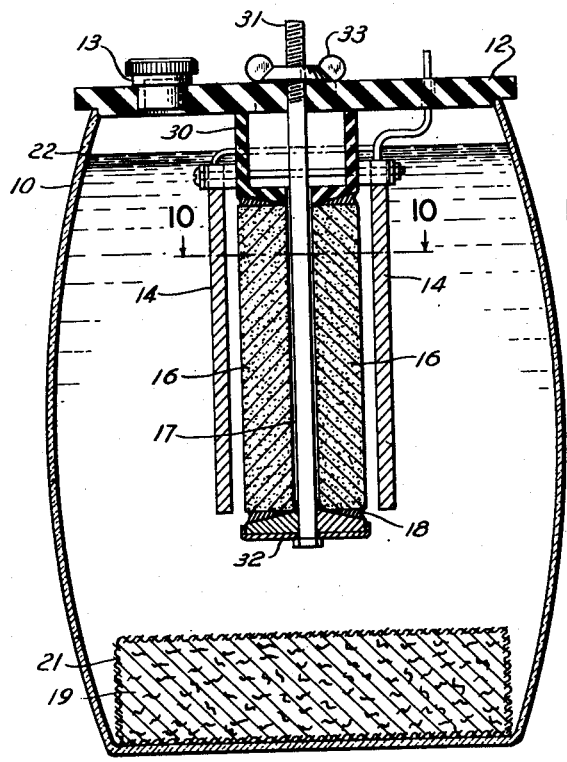
Figure 9 is a vertical section of another form of cell comprising porous carbon electrodes and zinc electrodes supported in a frame which, in turn, is supported by an apertured cell cover.
Figure 10:
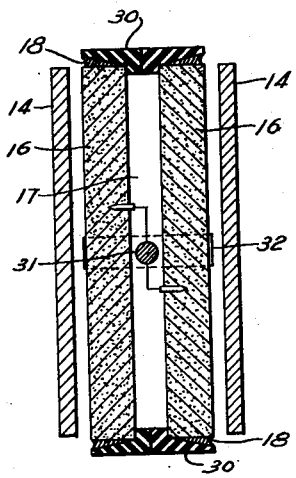
Figure 10 is a horizontal section of the electrode assembly taken along the line 10—10 of Figure 9.

In the modification shown in Figures 9 and 10, the porous carbon electrode 16 and the zinc electrode 14 are supported in a frame 30 which, in turn, is supported by apparatus cover 12. The cell casing 10 is of glass and is generally cylindrical or barrel shape and is similar in dimensions to the jars used for railway signal cells.

Figure 11:
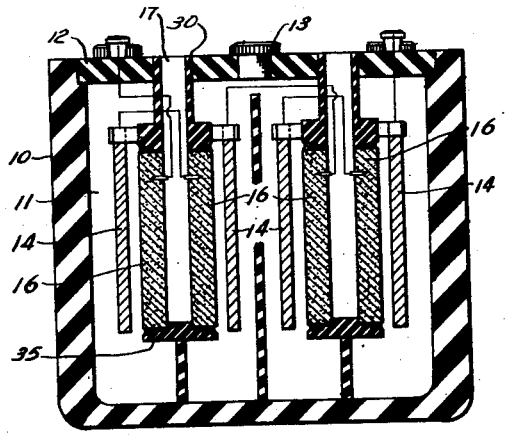
Figure 11 is a vertical section of a battery of cells, the electrodes of which are supported by frames in a manner generally similar to that shown in Figure 9.
Figure 12:
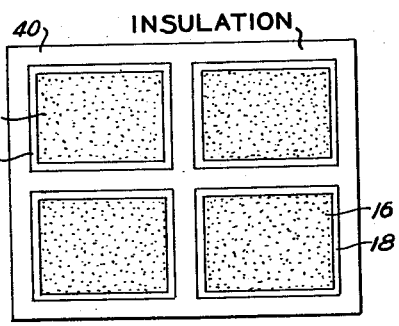
Figure 12 is a view of a frame or panel containing a plurality of porous carbon electrode members.

In the embodiment shown in Figure 11 the electrodes are supported by frames 35 in a manner generally similar to that shown in Figure 9. Should it be desired, a plurality of porous carbon electrode members 16 may be mounted in the frame or panel 40 as is shown in Figure 12.

Figure 2:
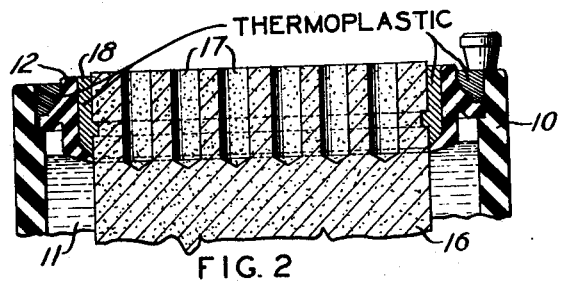
Figure 2 is a vertical section of the electrode and surrounding parts of one cell taken on line 2—2 of Figure 1.

According to the embodiment of the invention typically shown in Figures 1, 2, and 3, the path of oxygen from the air to the cathodic depolarizing region of the cell is shortened and freed from obstacles by forming within the electrode 16 one or more cavities 17 or "ventilating" holes opening freely into the air, closed to electrolyte 11, and extending approximately to the electrolyte level. This expedient assists the transfer of oxygen to that portion of the electrode at the electrolyte level and offsets any blocking or choking effects which might be produced by penetration of sealing material or electrolyte into the pores of the electrode above that level. The reason for not extending the holes far below the electrolyte level, is that the application of electrolyte-proofing material to the surfaces of the electrode exposed to the electrolyte in the ordinary manner described, for instance, in the patents mentioned above, although effective to inhibit generalized penetration of electrolyte into the pores of the electrode, does not always prevent the penetration of electrolyte into small, adventitious seams, cracks, and flaws sometimes existing in porous carbon electrodes. If electrolyte seeps or creeps into the ventilating well, the transfer of oxygen may be seriously hindered.

We have also found, however, that the seepage of electrolyte described above can be prevented by applying, to the portions of the electrode exposed to the air, electrolyte-proofing materials in greater amounts and greater concentrations than can be used in the portions exposed directly to the electrolyte, and that, when applied to these "dry" portions of the electrode, the relatively large amounts of proofing materials do not seriously interfere with the desired transfer of oxygen. Taking advantage of this discovery, our present invention further provides an electrode "ventilated" to well below the electrolyte level, and preferably to substantially the full depth of the electrode as shown in typical embodiments in Figures 4 through 11, the portion of the electrode below the electrolyte level and exposed to the air being provided, as by impregnation, with electrolyte-repellent material in amounts or concentrations sufficient to make the same quite impenetrable to electrolyte under normal conditions.

In all of the embodiments illustrated by Figures 1 to 11, the surfaces of the porous carbon electrode 16 exposed directly to the electrolyte 11 are preferably treated to make them repellent to electrolyte, by the methods and means shown, for example, in the patents mentioned above. Also, portions of the electrode 16 near the liquid-tight seals 18 between the electrode and its supporting means 10, 12, or 20, are preferably treated, as disclosed in our copending application Serial No. 87,626, with a relatively small amount of kerosene, light paraffin oil, fish oil, turpentine, nitrobenzene, azoxybenzene, or a mixture of two or more of such oils, to prevent a deep penetration of electrolyte into these portions. The dry surfaces of the porous carbon electrode 16, facing the cavity 17, may be made impenetrable to electrolyte but satisfactorily pervious to gas by the application of various electrolyte-repellent materials, including such materials as paraffin waxes; asphalt; linseed oil; solutions of rubber, halogenated rubber, or rubber-like polymers; and solutions of synthetic resins, for instance the polyvinyl resins. The concentration and viscosity of the material applied to the electrode surface should ordinarily be so adjusted that the electrode is penetrated no more than about one-thirty-second to one-eighth inch, all seams or cracks are sealed, and the pores are sufficiently open to permit free passage of air. The material may be applied in any convenient way, for example by painting, spraying, or dipping. For example, a solution containing about 8% to 10% rubber made by mixing equal parts of benzene and a proprietary rubber paint sold under the name "Goodrich Acid Seal Paint No. 1023," may be applied in any of these ways. Another typical material for this purpose is a mixture of equal parts of kerosene and cylinder oil, e. g. "Sohio 650."

Other features which may be used in any of the types of constructions shown in Figures 1 to 11, include the use of a cast of electrolyte-forming material, such as sodium hydroxide monohydrate, about one or more of the electrodes in a manner similar to that shown in Figure 6; and the use of an electrolyte extender 19, as shown in Figures 6 and 9, which may conveniently be contained in a permeable envelope 21, say of cloth or wire screening, as shown in Figure 9.

Additional features which may be used in the reserve type of cells are frangible diaphragms (not shown) covering the filler openings 13 and the exposed portions of the carbon electrodes 16; these diaphragms may be destroyed when the cell is put into service.

The provision of ventilation to the full depth of the electrode 16, as shown in Figures 4 to 11, not only permits heavier current drains and provides increased service life, it also promotes a uniformity of current density over the entire surface of the carbon electrode, and this, in turn, promotes the uniformity of consumption of zinc over the surface of the zinc electrodes. This last mentioned effect prevents reduction in zinc surface area during use of the cell and thereby prevents the loss in operating quality ordinarily attributable to this factor. Manufacture is thus facilitated, since the flat, uniform zinc plates (14) indicated in Figs. 9, 10 and 11 may be substituted for the conventional tapered electrodes (14) shown in Figs. 1, 4, 5, 6, and 8.

Figure 4:
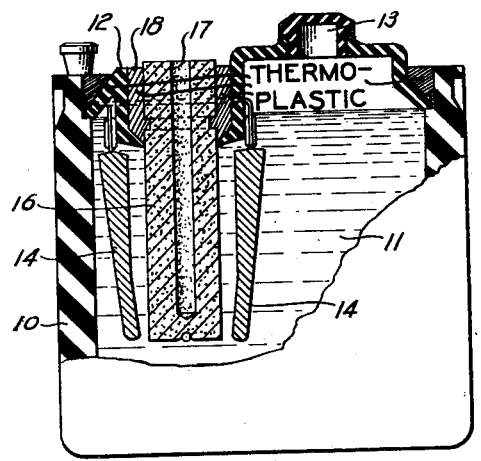
Figure 4 is a partial vertical section of a primary galvanic cell similar to that shown in Figure 1, but embodying an electrolyte-repellent porous carbon electrode provided with one or more ventilating holes open to the air at one end, closed to electrolyte, and extending nearly to the full depth of the electrode.

Mounting the carbon electrode 16 in a frame, either of the solid back type 20 shown in Figure 5 or of the types 30 and 35 shown in Figures 9, 10, and 11, offers many advantages over the hollow carbon electrode shown in Figure 4 and the exposed carbon electrode shown in Figures 6, 7, and 8. The frame assembly is adapted to easy and inexpensive manufacture. The frame itself may be made of hard rubber, battery case material, electrolyte resisting synthetic resin, or other relatively inexpensive and easily shaped material. The porous carbons may be formed in simple shapes and sealed into the frames with pitch, wax, or other suitable plastic. The frame securely holds and protects the relatively more fragile porous carbon electrode, and the latter may be made relatively thin, say one half the thickness ordinarily required of the type of electrodes shown in Figures 1 to 4. The reduction in the amount of porous carbon required effects a substantial saving in the cost of materials for a cell. Before the porous carbon shapes are sealed into the frame, the former may be given the desired surface treatments described above, thereby taking advantage of another convenience provided by the frame mounted constructions. It is much easier to spray or otherwise apply treating materials to the surface of a slab or carbon than to the inside of a hollow electrode.

Furthermore, the mounting frame 20, 30, or 35, may be supported within a cell or battery casing in a more simple and more rigid fashion. In suitable instances, for example in the embodiments shown in Figures 5 and 11, the frame may be secured to, and supported by, the wall of the cell or battery case 10, and the top of the well 17 may be made flush with the top surface of the cover 12 for convenience and neatness of appearance. The frame may also be used to support the zinc electrode or electrodes 14 at the desired distance from the carbon electrodes 16, as indicated in Figures 9 and 11.

As shown in Figure 9, the frame 30 may conveniently be supported by the cell cover 12, suitably by a metal rod 31, clamp 32, and thumbscrew 33. Electrical connection to one or both carbon electrodes may conveniently be made through the supporting rod 31, as indicated in Figure 10. The type of construction shown in Figures 9 and 10 is particularly well suited for use when it is desired to use as many parts of the cell as possible for as long a time as possible, the individual parts being separately replaced as they are consumed, worn out, damaged, or become defective. As can readily be seen from an examination of Figures 9 and 10, the cell may readily be dismantled for the replacement of any desired part.

A further advantage of the frame type of construction is that a sealing layer 22 of a saponifiable oil or of a mixture of a saponifiable oil and a mineral oil may be used on the surface of the electrolyte, as shown in Figure 9, to decrease evaporation losses. Such an oil layer would rapidly ruin a porous carbon electrode in direct contact therewith.

Frame mounting of the carbon electrodes is also of great advantage in batteries of cells, particularly in batteries containing an even number of cells as illustrated in Figure 11. A compact battery of small volume and pleasing appearance, and containing only one zinc and one carbon for each cell may easily be constructed to deliver a relatively high current and a high voltage over a long service life.

The partially ventilated electrode construction illustrated in Figures 1 to 3 is particularly adapted for use in cells required to deliver a relatively small current, and has the advantages of requiring only slight modification in previously existing cell constructions and of not requiring the special electrolyte proofing of the dry surfaces of the electrode. When this type of electrode is used, it is preferred to provide a plurality of cavities, as shown in Figure 2, rather than a single cavity as illustrated in Figure 3, because the former produces a structurally stronger electrode having better electrical conductivity. A further advantage in the use of a plurality of cavities is that, if one cavity should perchance be penetrated by electrolyte or become obstructed otherwise, the remaining cavities would not necessarily be affected. By the use of suitable partitions, the multi-cavity construction may also be used in the electrodes shown in Figures 8 to 11.

The superiority of the fully ventilated electrodes shown in Figures 4 to 11 is most marked in cells subjected to heavy current drain in service, and where a particularly compact cell is required.

It has been suggested herein that the principles of the present invention may be embodied in cells other than the air depolarized galvanic cell. Many of such embodiments will be apparent from a perusal of the above description. For instance, the use of fully ventilated electrodes, special electrolyte proofing in the ventilated portion, and frame mounting of the carbon electrodes, may be used to advantage in electrochemical processes of the types in which a fluid is passed through a porous electrode to the electrode-electrolyte interface. Examples of such types are the electrowinning of copper and zinc with the assistance of sulphur dioxide, the production of aliphatic halides and halohydrins, brine electrolysis, the production of sulfuric acid from sodium sulfate solution, and the electrolytic oxidation of potassium ferrocyanide to potassium ferricyanide.

Electrochemical processes of the types last mentioned may, if they are to be conducted on a large scale, require the use of relatively large porous carbon electrodes. Porous carbon is relatively fragile and readily frangible, and it is very difficult to manufacture in uniform large masses. A modification, shown in Figure 12, of the frame construction of our invention, permits the construction of large electrodes of porous carbon. As illustrated in Figure 12, a number of pieces or slabs of porous carbon 16, each of a size convenient to manufacture and handle, are sealed to a frame 40 which resembles somewhat a frame for window glass. The frame may be made of any strong material which is resistant to electrolyte, and the individual pieces of carbon may be secured and sealed to the frame by a suitable plastic, or by a soft metal in a proper instance.

Electrodes of this type are easy to construct; broken or damaged panels may be replaced; and individual panels may be so chosen that a desired uniformity of characteristics (or a desired variation in characteristics) is attained over the surface of the electrode.

This application is in part a continuation of our application Serial No. 87,626, filed June 27, 1936.

We claim:

1. An electric cell comprising a container; an electrolyte within said container; and electrodes in contact with said electrolyte, at least one of said electrodes being porous and consisting chiefly of carbon; said porous electrode or electrodes having a surface in contact with said electrolyte and a dry surface well below the level of the top surface of such electrolyte and freely exposed to a gaseous atmosphere, said surfaces being differently treated to impart thereto electrolyte-repellent properties without seriously hindering the passage of oxygen, and the dry surface alone being so impervious to electrolyte as seriously to impair its suitability for use as an electrolyte contacting surface and to prevent the penetration of electrolyte through adventitious passageways in the carbon.

2. An air depolarized primary galvanic cell comprising a container; an electrolyte within said container; electrodes in contact with said electrolyte, at least one of said electrodes being porous, consisting principally of carbon, and being repellent to electrolyte; and supporting means for said porous electrode or electrodes; the porous electrode or electrodes being fastened to said supporting means to form a dry chamber communicating freely with the air outside said cell and extending well below the level of the top of the electrolyte; and said porous electrode or electrodes containing a waterproofing agent on the sides thereof, said waterproofing agent being so different in kind or amount that the side adjacent the electrolyte is electrolyte-repellent, oxygen pervious, but suitable for use as an electrolyte contacting surface, and the side adjacent the chamber is previous to oxygen but so impervious to electrolyte as to prevent the entrance into the chamber of electrolyte penetrating adventitious passageways in the electrode.

3. An air depolarized primary galvanic cell comprising a container; a vented cover for said container; an electrolyte within said container; a body of electrolyte regenerating material within said electrolyte; two zinc electrodes submerged in said electrolyte; two gas pervious porous carbon flat electrodes submerged in said electrolyte, the porous carbon electrodes being repellent to electrolyte; means for supporting said electrodes from said cover; said supporting means including an electrolyte-proof frame to hold said carbon electrodes in parallel juxtaposition with a space between, thereby providing a dry chamber or cavity, including said space, communicating freely with the air outside the cell through said vent in said cover; said frame supporting one zinc electrode in parallel spaced juxtaposition to each carbon electrode; only those surfaces of the porous carbon electrodes facing said dry chamber being impervious to electrolyte.

4. A cell comprising a container; an electrolyte within said container; and electrodes in contact with said electrolyte, at least one of said electrodes being flat, porous, and consisting chiefly of carbon; said porous electrode or electrodes having a surface in contact with the electrolyte and a dry surface exposed freely to a gaseous atmosphere, the said surface in contact with the electrolyte being impregnated with a solution containing rubber in concentration only sufficient to make said surface repellent but not impervious to electrolyte, and the dry surface exposed freely to a gaseous atmosphere being treated with a solution containing rubber in a greater concentration sufficient to make the latter surface impervious to electrolyte, both of said surfaces being pervious to oxygen.

5. A primary galvanic cell comprising a container; a vented cover for said container; an electrolyte within said container; a zinc electrode submerged in said electrolyte; gas pervious porous carbon flat electrode members submerged in said electrolyte; the porous electrode members being repellent to electrolyte; means for supporting said electrode members from said cover; said supporting means including an electrolyte-proof frame to hold said carbon electrode members in juxtaposition with a space therebetween, thereby providing a dry chamber or cavity, including said space, communicating freely with the air outside the cell through the vent in said cover; said frame supporting said zinc electrode in spaced juxtaposition to said carbon electrode members; only those surfaces of the porous carbon electrode members facing said dry chamber being impervious to electrolyte.

GEORGE W. HEISE.
ERWIN A. SCHUMACHER.